(12) United States Patent
Lim et al.

(10) Patent No.: US 7,639,454 B2
(45) Date of Patent: Dec. 29, 2009

(54) PERPENDICULAR MAGNETIC RECORDING HEAD COMPRISING GAP SHIELD

(75) Inventors: Chee-kheng Lim, Yongin-si (KR); Eun-sik Kim, Seoul (KR); Yong-su Kim, Seoul (KR); Young-hun Im, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 301 days.

(21) Appl. No.: 11/493,585

(22) Filed: Jul. 27, 2006

(65) Prior Publication Data

US 2007/0025018 A1 Feb. 1, 2007

(30) Foreign Application Priority Data

Jul. 27, 2005 (KR) ................ 10-2005-0068542

(51) Int. Cl.
*G11B 5/11* (2006.01)
*G11B 5/23* (2006.01)
(52) U.S. Cl. .................................... 360/125.3
(58) Field of Classification Search ............ 360/125, 360/126, 125.3; 29/603.07
See application file for complete search history.

(56) References Cited

U.S. PATENT DOCUMENTS

| 5,777,815 | A | 7/1998 | Kasiraj et al. |
| 7,322,095 | B2 * | 1/2008 | Guan et al. .............. 29/603.07 |
| 2004/0201918 | A1 * | 10/2004 | Guan et al. ................ 360/125 |
| 2005/0068671 | A1 * | 3/2005 | Hsu et al. ................... 360/125 |
| 2005/0068678 | A1 * | 3/2005 | Hsu et al. ................... 360/126 |
| 2005/0237665 | A1 * | 10/2005 | Guan et al. ................ 360/125 |

FOREIGN PATENT DOCUMENTS

| JP | 2000-251227 A | 9/2000 |
| KR | 10-0259453 B1 | 3/2000 |

* cited by examiner

*Primary Examiner*—Craig A Renner
(74) *Attorney, Agent, or Firm*—Sughrue Mion, PLLC

(57) ABSTRACT

A perpendicular magnetic recording head includes: a main pole; a return pole spaced a predetermined gap from the main pole; an induction coil inducing a magnetic field on the main pole; and two or more gap shields, wherein the two or more gap shields are formed in the gap between the main pole and the return pole.

8 Claims, 11 Drawing Sheets

PERPENDICULAR MAGNETIC RECORDING HEAD COMPRISING GAP SHIELD

CROSS-REFERENCE TO RELATED PATENT APPLICATION

This application claims priority from Korean Patent Application No. 10-2005-0068542, field on Jul. 27, 2005 in the Korean Intellectual Property Office, the disclosure of which is incorporated herein in its entirety by reference.

BACKGROUND OF THE INVENTION

1. Field of the Invention

Apparatuses consistent with the present invention relate to a perpendicular magnetic recording head, and more particularly, to a perpendicular magnetic recording head including a gap shield formed between a main pole and a return pole to improve the field profile of the perpendicular magnetic recording head, and a perpendicular magnetic recording apparatus including the same.

2. Description of the Related Art

With the advent of the Information Age, the amount of information that a person or an organization deals with has significantly increased. For example, many users employ computers having high data processing speed and large information storage capacity to access the Internet and obtain various pieces of information. CPU chips and computer peripheral units have been developed to enhance the computer data processing speed, and various types of high density information storage media like hard disks are being researched to enhance the data storage of computers.

Recently, various types of recording media have been introduced. Most of the recording media use a magnetic layer as a data recording layer. Data recording of a magnetic recording media can be classified into longitudinal magnetic recording and perpendicular magnetic recording.

In the longitudinal magnetic recording, data is recorded using the parallel alignment of the magnetization of the magnetic layer on a surface of the magnetic layer. In the perpendicular magnetic recording, data is recorded using the perpendicular alignment of the (magnetization) on a surface of the magnetic layer. From the perspective of data recording density, the perpendicular magnetic recording is more advantageous than the longitudinal magnetic recording FIG. 1A illustrates a conventional perpendicular magnetic recording apparatus. Referring to FIG. 1A, the conventional magnetic recording apparatus includes a recording medium 10, a writing magnetic head 30 recording data on the recording medium 10, and a reading magnetic head 20 reading the data of the recording medium 10. The writing magnetic head 30 includes a sub yoke 21 and a intermediate layer 50. The reading magnetic head 20 includes first and second magnetic shield layers S1 and S2, and a reading magnetoresistance device 31 is interposed between the first and second magnetic shield layers S1 and S2. When data is being read from a predetermined position of a selected track, the first and second magnetic shield layers S1 and S2 shield the magnetic field generated by magnetic elements around the predetermined position from reaching the predetermined position on the track. The reading magnetoresistance device 31 may be a giant magnetoresistance (GMR) or a tunnel magnetoresistance (TMR). In FIG. 1A "X" denotes a track direction "Y" denotes a cross direction, and "Z" denotes a direction perpendicular to both X and Y.

FIG. 1B is an extended view of portion A of the magnetic recording apparatus shown in FIG. 1A. The magnetic recording apparatus includes a main pole P1 of the writing magnetic head 30, a return pole P2 separated from the main pole P1, and an induction coil generating a magnetic field to the main pole P1. The quality of signals input to the recording medium 10 depends on the writing magnetic head 30, and particularly, on magnetic features of the main pole P1 and the second return pole P2. As recording density of recording devices increases, the bit size of the recording medium 10 becomes smaller. Accordingly, the magnetic material used for the main pole P1 and the return pole P2 needs to have a great saturated magnetization value, great permeability, and a soft magnetic characteristic with small coercivity. In FIG. 1B, "G" denotes a gap between the main pole P1 and the return pole P2.

When recording data on the recording medium 10, the magnetic field generated by the main pole P1 of the writing magnetic head 30 magnetizes a recording layer of the recording medium 10 in a predetermined direction, and returns to the return pole P2. The perpendicular magnetic recording head moves in the direction of the track of the recording medium 10 and records data. Preferably, the data is recorded inside the track. However, it is difficult to control the magnetic field emitted from the main pole P1, and a recording layer of an area outside the track, that is, an off track area is affected. This deteriorates the recording characteristic.

FIGS. 2A and 2C illustrate a structure of a perpendicular magnetic recording head in which side shields SS are formed on both sides of the main pole P1 for reducing the above described spray field effect. FIG. 2A illustrates a lateral side of the main pole P1 and a lateral side of the return pole P2. FIG. 2B is a front view of the main pole P1 and the return pole P2. FIG. 2C is a cross-sectional view of an air bearing surface (ABS) seen from the magnetic recording medium in the direction of the recording magnetic head 30. Referring to FIGS. 2A through 2C, side shields SS reduce the influence of the magnetic field emitted from the main pole P1 on the off track area of the magnetic recording medium. However, when a shield is simply formed, the strength of the perpendicular magnetic field for recording data in the perpendicular magnetic medium is reduced. Thus, a shield structure that is optimized to effectively control the magnetic field profile is required.

SUMMARY OF THE INVENTION

The present invention provides a perpendicular magnetic recording head that increases the track density of a recording medium, has an enhanced magnetic field profile, and prevents or minimizes a leakage magnetic field, and a perpendicular recording apparatus employing the same:

According to an aspect of the present invention, there is provided a perpendicular magnetic recording head comprising: a main pole; a return pole spaced a predetermined gap from the main pole; an induction coil inducing a magnetic field on the main pole, and two or more gap shields, wherein the gap shields are formed in the gap between the main pole and the return pole.

The gap shields may be symmetrical around a line that connects centers of lower end surfaces (ABS) of the main pole and the return pole.

The length of the gap shields in a track direction of a recording medium, on which data is recorded by the perpendicular magnetic recording head, may be smaller than the width of the gap in the track direction.

The width of the gap between lower end portions of the main pole and the return pole may be 100 nm or less.

The gap shield may be formed of a soft magnetic material.

According to an aspect of the present invention, there is provided a perpendicular magnetic recording apparatus comprising: writing magnetic head comprising: a magnetic recording medium on which data is recorded; a main pole which generates a magnetic field to the recording surface of the magnetic recording medium; a return pole spaced a predetermined gap from the main pole; an induction coil which induces a magnetic field on the main pole; two or more gap shields; and a reading magnetic head, wherein the gap shields are formed in the gap between the main pole and the return pole.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS

Figure 1A:
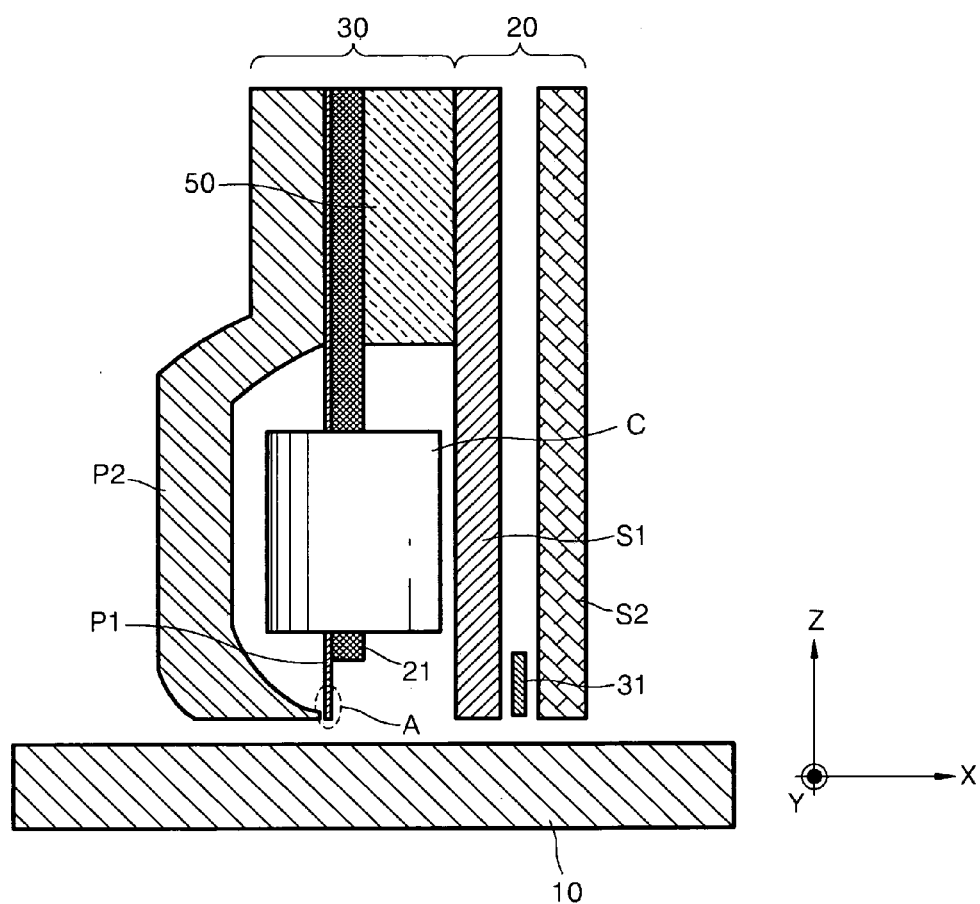
FIGS. 1A through 1C illustrate a conventional perpendicular magnetic recording apparatus and a conventional perpendicular magnetic recording head without a shield.

The present invention will now be described more fully with reference to the accompanying drawings, in which exemplary embodiments of the invention are shown. In the drawings, the thicknesses of layers and regions are exaggerated for clarity.

Figure 3A:
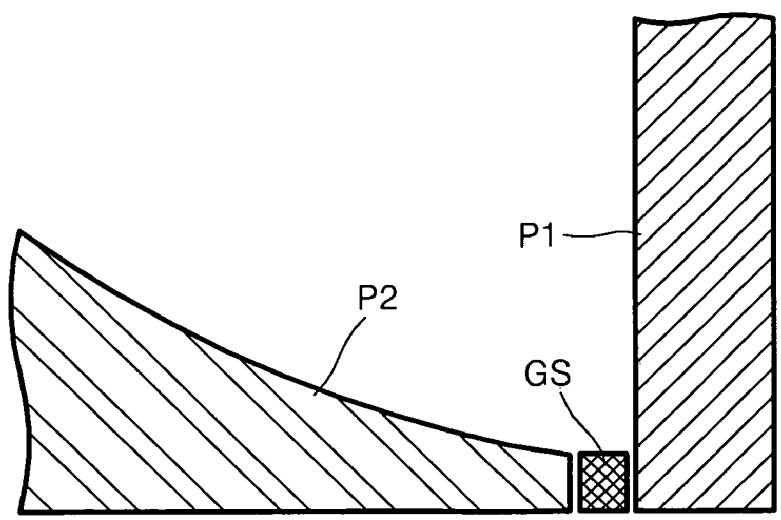
FIGS. 3A through 3C illustrate a perpendicular magnetic recording head including gap shields according to an exemplary embodiment of the present invention.
Figure 3B:
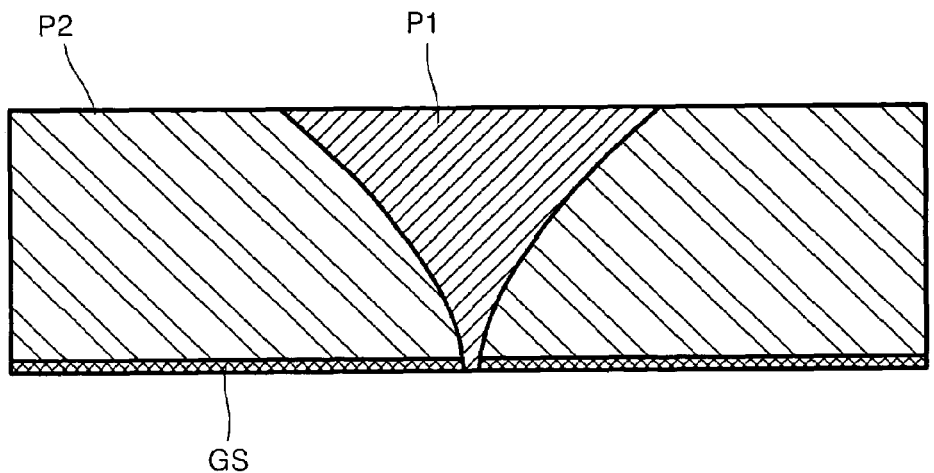
Figure 3C:
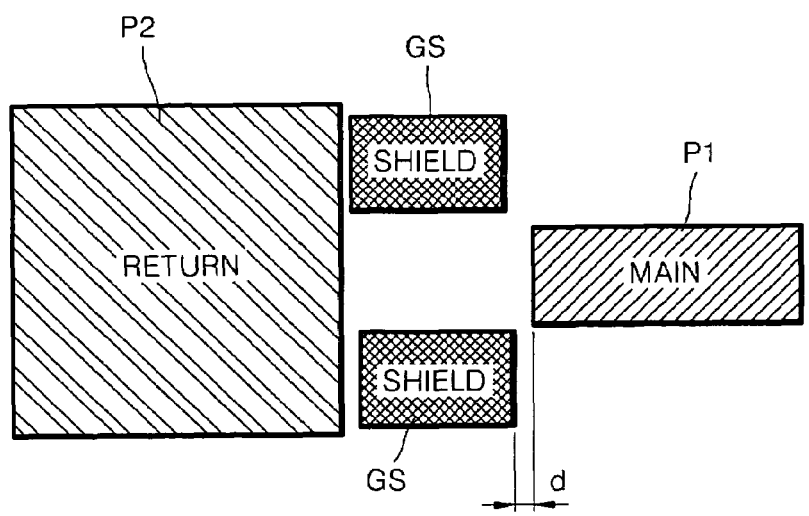

FIGS. 3A through 3C illustrate a perpendicular magnetic recording head including gap shields according to an exemplary embodiment of the present invention. FIG. 3A is an enlarged view of an end portion of a main pole P1 and a return pole P2 of a writing magnetic head as illustrated in FIG. 1B with the inclusion of the gap shield GS, and FIG. 3B is a front view of the end portion seen from the main pole P1 in the direction of the return pole P2. FIG. 3C illustrates the structure of the magnetic recording head in the perpendicular magnetic recording medium direction (ABS).

Referring to FIGS. 3A through 3C, the perpendicular magnetic recording head including gap shields according to an exemplary embodiment of the present invention moves in the direction of the track of the magnetic recording medium, and more than two gap shields GS are formed in a gap region between the main pole P1 and a return pole P2 that apply a magnetic field to the recording medium.

The width of a gap at lower portions of the main pole P1 and the return pole P2 is less than 100 nm, more preferably, but not necessarily, less than 50 nm. The gap is extended to the upper portions of the main pole P1 and the return pole P2 and generally formed of $Al_2O_3$, nitride aluminum, silicon (Si), or silicon oxide ($SiO_2$). The gap in the center between the main pole P1 and the return pole P2 is wider than the gap in the lower portion, and the upper ends of the main pole P1 and the return pole P2 are connected to each other. A gap shield GS in the present exemplary embodiment is formed between the main pole P1 and the return pole P2. The distance between the gap shield GS and the main pole P1 and the distance between the gap shield GS and the return pole P2 are respectively less than several nanometers, and the distance between the gap shields GS can also be controlled. The gap shield GS is formed of a soft magnetic material, as an ordinary shield, for example, of NiFe or CoNiFe. Since the gap shield GS is connected to an insulating layer formed between the main pole P1 and the return pole P2, the gap shield GS is insulated from the main pole P1 and the return pole P2. FIGS. 3A through 3C illustrate gap shields GS formed symmetrically about a line that connects the centers of the lower end of the air bearing surface (ABS) of the main pole P1 and the return pole P2. However, this is a simplified structure, and the gap shields GS can also be formed asymmetrically.

Hereinafter, the magnetic characteristics of the perpendicular magnetic recording head according to an exemplary embodiment of the present invention and the conventional perpendicular magnetic recording head will be compared.

Figure 1B:
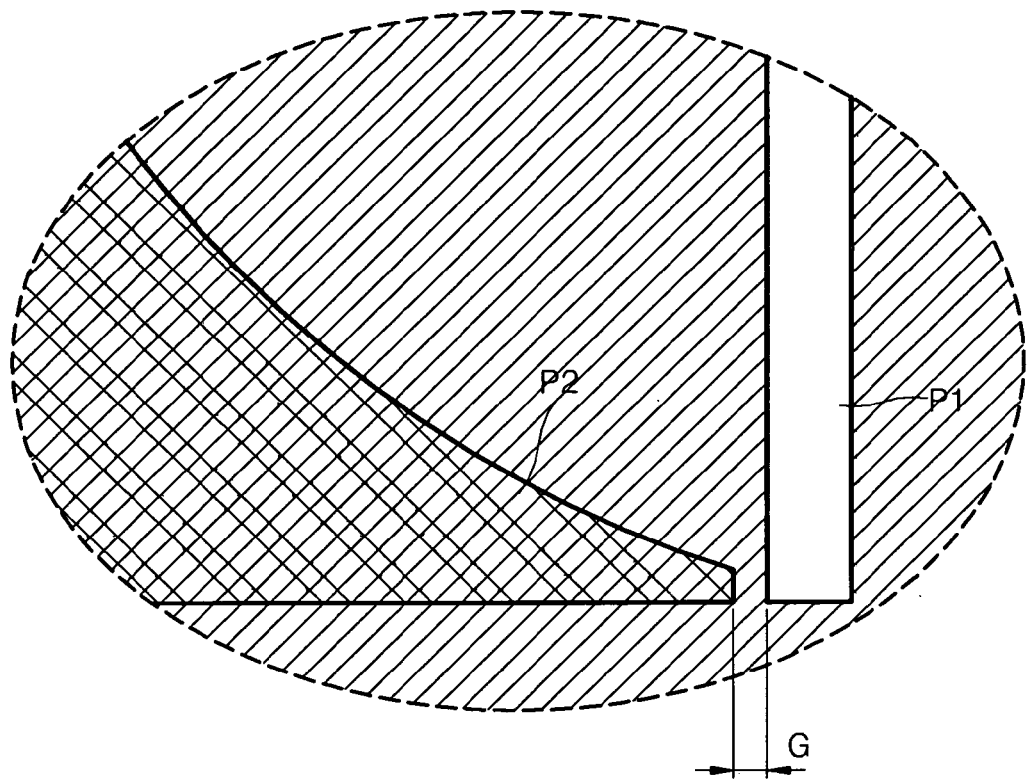
Figure 4A:
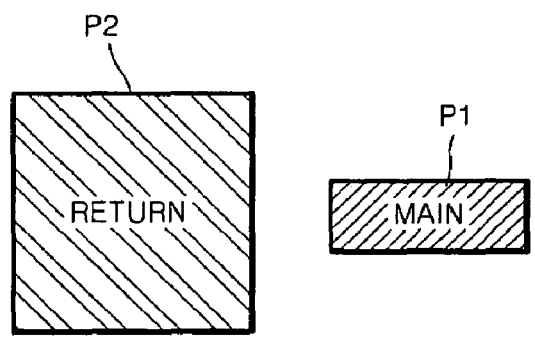
FIG. 4A is a cross-sectional view of a conventional perpendicular magnetic recording head without a shield.
Figure 4B:
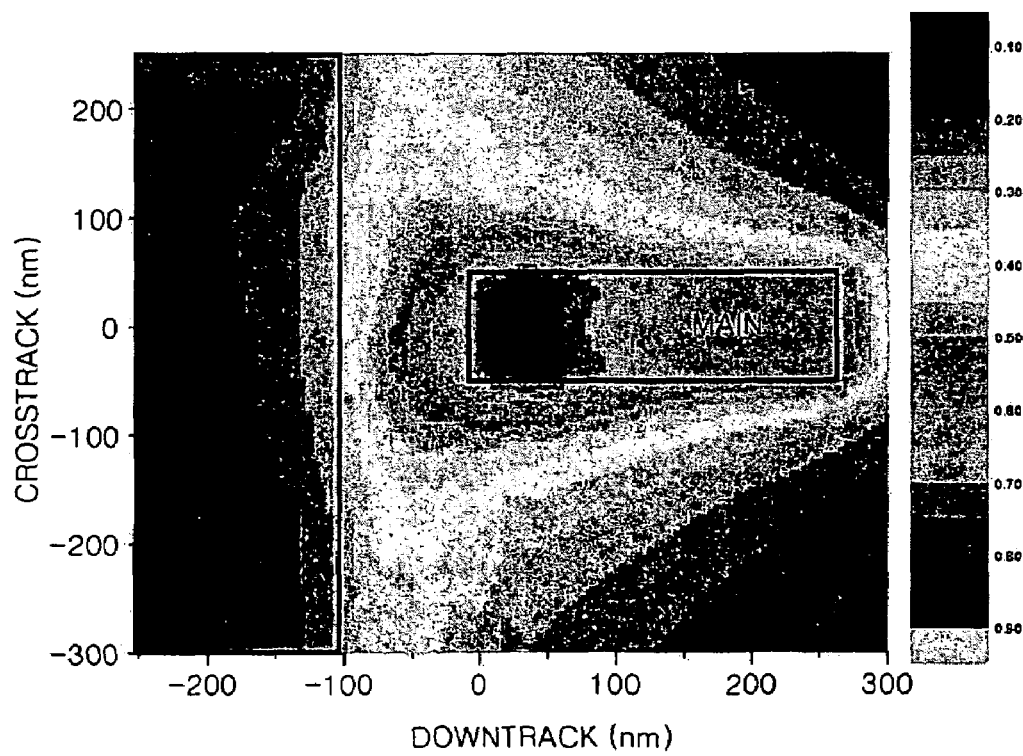
FIG. 4B illustrates the magnetic field of the conventional perpendicular magnetic recording head without a shield.

FIG. 4A illustrate a cross-section of the conventional perpendicular magnetic recording head illustrated in FIGS. 1A and 1B. FIG. 4B illustrates the magnetic field of the perpendicular magnetic recording head of FIG. 4A. The horizontal axis in FIG. 4B denotes the direction of the track of the magnetic recording medium, and the vertical axis denotes a cross-track distance in nm. Here, the size of the magnetic field of a recording head without a shield between the main pole P1 and the return pole P2 will be described.

Referring to FIGS. 4A and 4B, when data is recorded on a recording medium (not shown), the magnetic field emitted from the main pole P1 has a high intensity in the gap region between the main pole P1 and the return pole P2. Moreover, as a strong magnetic field is maintained in the off track area within a 100 nm from the main pole P1 in the cross-track direction, which is the vertical axis, the characteristic of the recording medium may be deteriorated. In detail, when distributed in a wide area, the magnetic field generated in the lower end of the main pole P1 deviates from the predetermined track area of the recording medium in the lower portion of the main pole P1 and affects random neighboring tracks, thus influencing data stability.

Figure 2A:
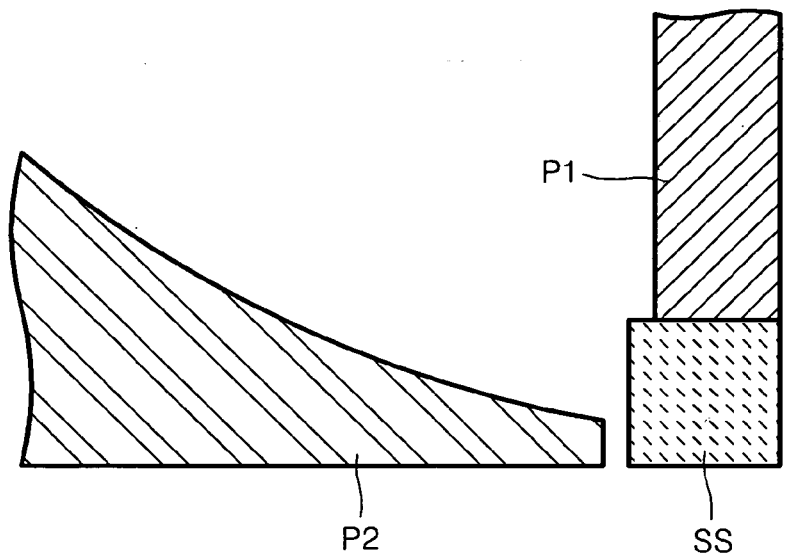
FIGS. 2A through 2C illustrate a conventional perpendicular magnetic recording head with side shields.
Figure 2B:
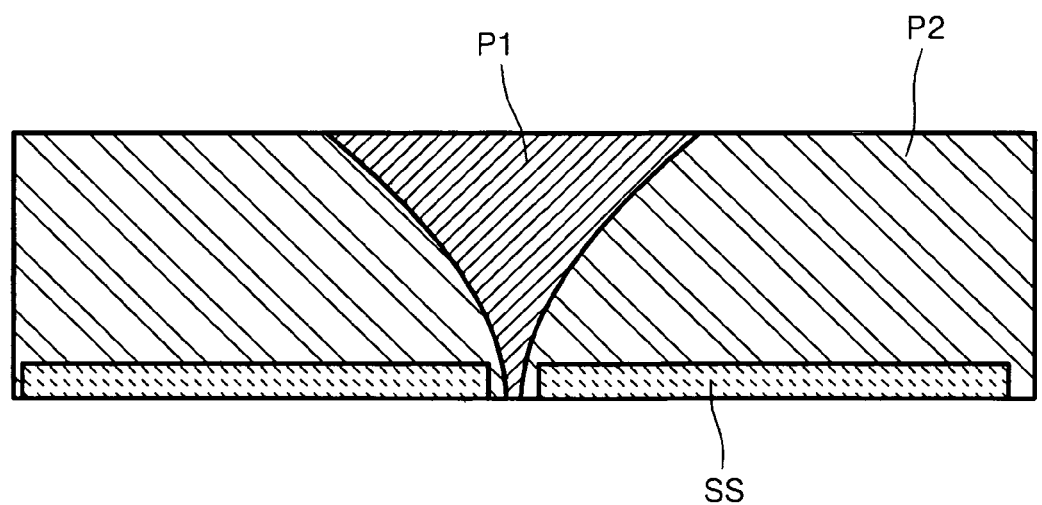
Figure 2C:
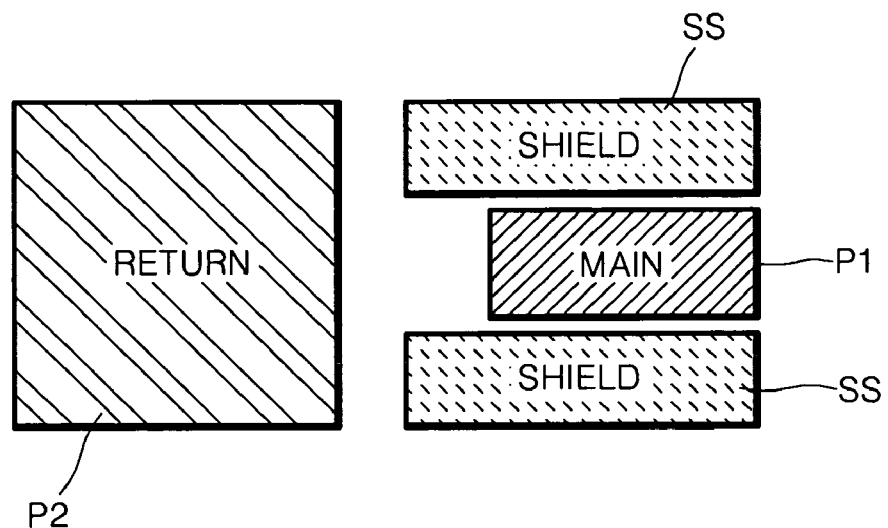
Figure 5A:
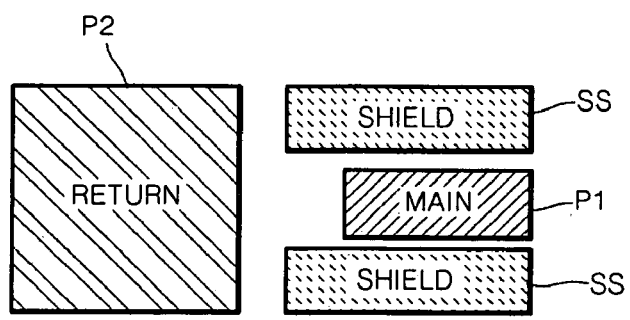
FIG. 5A is a cross-sectional view of a conventional perpendicular magnetic recording head including side shields.
Figure 5B:
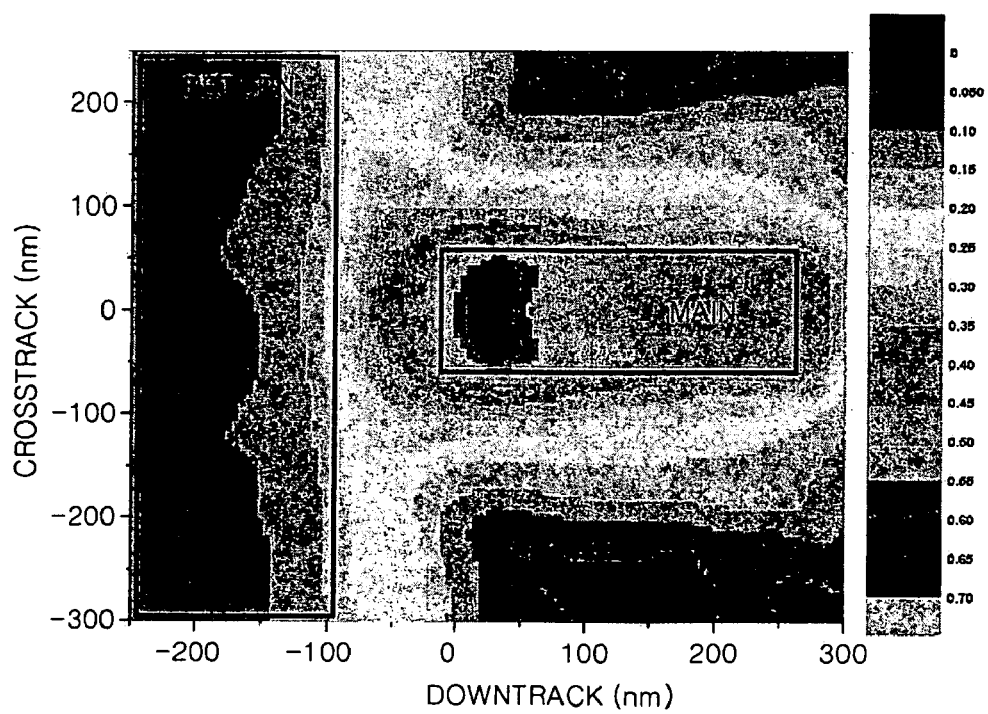
FIG. 5B illustrates the magnetic field profile of the conventional perpendicular magnetic recording head including side shields.

FIG. 5A illustrates a perpendicular magnetic recording head that is similar to that illustrated in FIG. 2C and includes side shields SS on both sides of the main pole P1. FIG. 5B shows the magnetic field of the above perpendicular magnetic recording head of FIG. 5A. The horizontal axis of FIG. 5B denotes the direction of the track of the magnetic recording medium, and the vertical axis denotes a cross track distance in nm.

Referring to FIG. 5B, the size of the magnetic field at the side of the main pole P1 in the down-track direction above 0 where side shields SS are formed is reduced. However, a strong magnetic field is maintained in the cross track direction in the gap region between the main pole P1 and the return pole P2. That is, the magnetic field is strong in an area no farther than 100 nm from the center of the main pole P1.

Figure 6A:
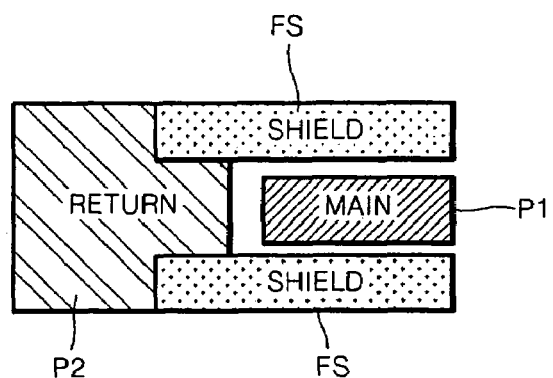
FIG. 6A is a cross-sectional view of a conventional perpendicular magnetic recording head including front shields.
Figure 6B:
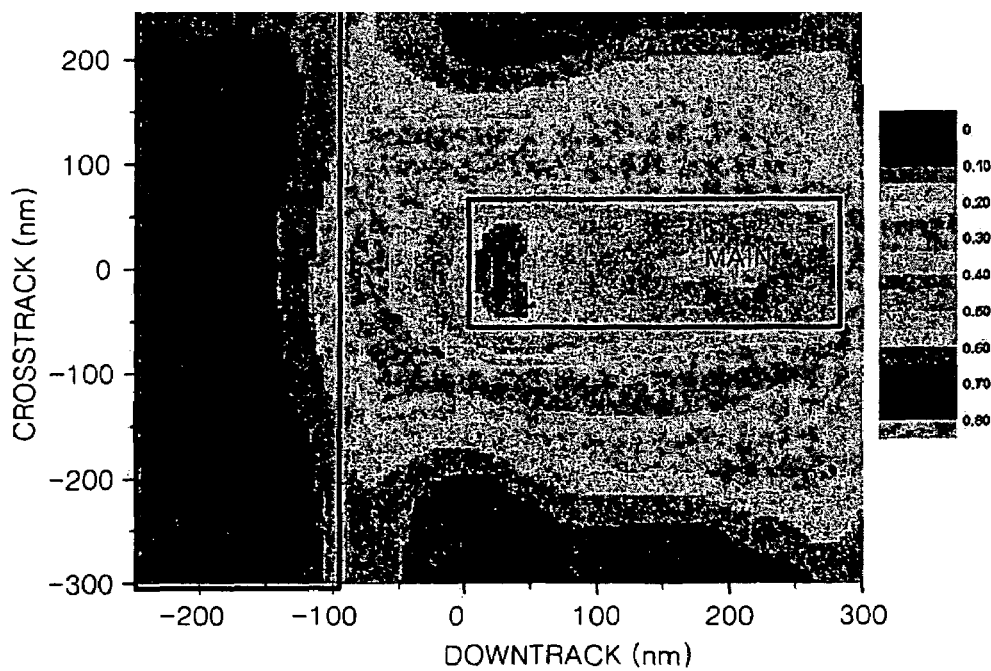
FIG. 6B illustrates the magnetic field profile of the conventional perpendicular magnetic recording head including front shields.

FIG. 6A illustrates a perpendicular magnetic recording head in which shields are formed on both sides of the main pole P1 and between the main pole P1 and the return pole P2, wherein the perpendicular magnetic recording head includes a front shield FS, that is, a structure in which the off track area of the main pole P1 outside the track direction is substantially covered with shields. FIG. 6B is a graph illustrating the magnetic flux distribution of the perpendicular magnetic recording head of FIG. 6A. The horizontal axis in FIG. 6B denotes the direction of the track of the magnetic recording medium, and the vertical axis denotes a cross-track distance in nm.

Referring to FIG. 6B, the strength of the magnetic field of the off track area is smaller than that shown in FIGS. 4B and 5B, and particularly, the strength of the magnetic field in the gap between the main pole P1 and the return pole P2 is relatively small. However, when shields are covered all around the main pole P1, the strength of the magnetic field that is emitted from the main pole P1 and magnetizes the recording layer of the perpendicular magnetic recording head becomes small and the recording efficiency significantly decreases. In other words, the distribution around the main pole P1 may be desirable, but the strength of the magnetic field for magnetizing the perpendicular magnetic recording head is smaller. Thus, the quality of the magnetic head is reduced.

Figure 7A:
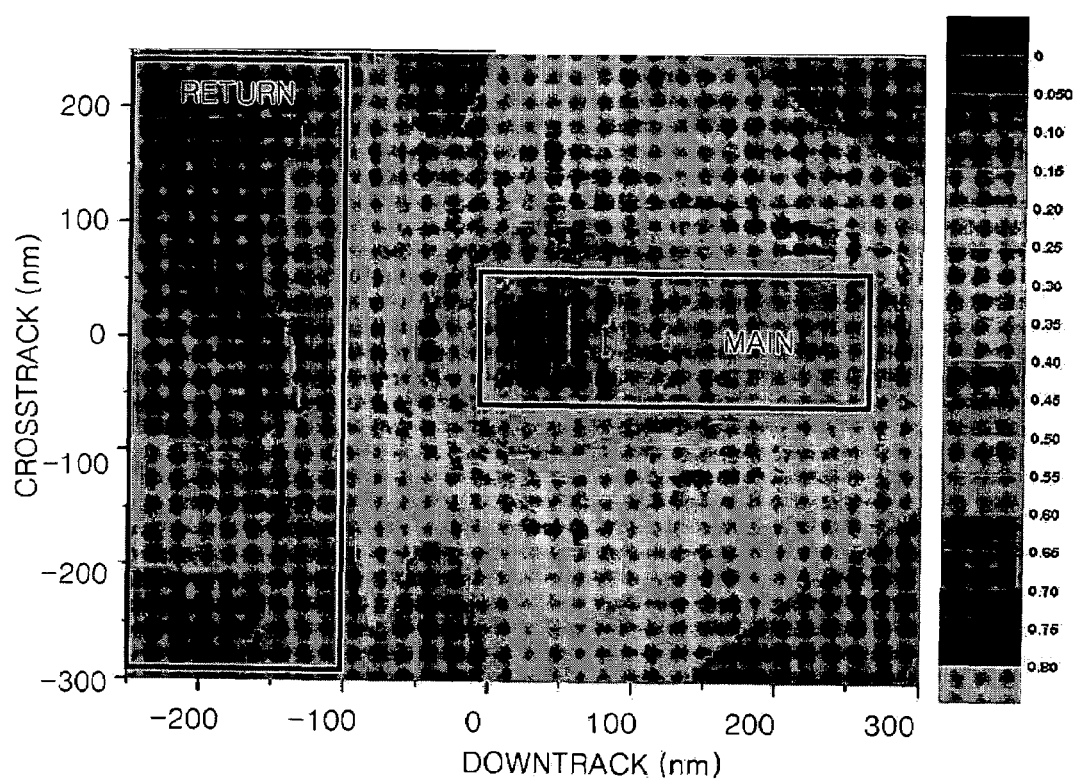
FIGS. 7A and 7B illustrate the magnetic field profile around the main pole and the return pole of the perpendicular magnetic recording head including gap shields according to an exemplary embodiment of the present invention.
Figure 7B:
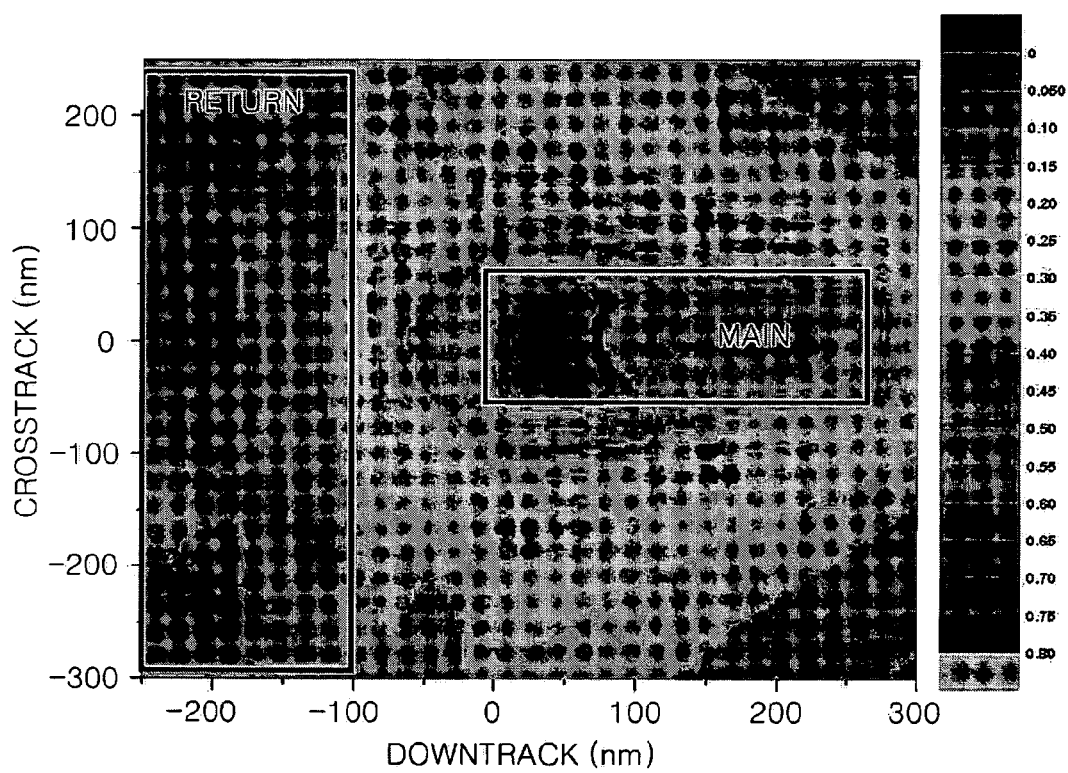

FIGS. 7A and 7B are graphs showing magnetic field of the perpendicular magnetic recording head of FIG. 3B according to an exemplary embodiment of the present invention. Shields are formed in the gap between the main pole P1 and return pole P2 of the perpendicular magnetic recording head. In FIG. 7A, a distance between the main pole P1 and the gap shield GS of FIG. 3B is 10 nm, and in FIG. 7B, a distance between the main pole P1 and the gap shield GS is 30 nm. The horizontal axis in FIGS. 7A and 7B denotes the direction of the track of the perpendicular magnetic recording medium, and the vertical axis denotes a cross-track distance in nm.

Referring to FIGS. 7A and 7B, the strength of the magnetic field in the off track area around the gap between the main pole P1 and the return pole P2 significantly decreases in the perpendicular magnetic recording head according to the present exemplary embodiment, compared to the magnetic head without a shield in FIG. 4B or the magnetic head including side shields in FIG. 5B. When compared with the magnetic head including shields in front of the off track area as illustrated in FIG. 6B, the magnetic flux density around the main pole P1 is much greater in the magnetic head in FIGS. 7A and 7B. To summarize, in the perpendicular magnetic recording head according to the present exemplary embodiment, the magnetic flux density in the off track area of the gap, which may have negative effects, can be reduced, and the strength of the magnetic field that can easily reverse the magnetization of the recording layer of the perpendicular magnetic recording medium can be controlled.

Figure 1C:
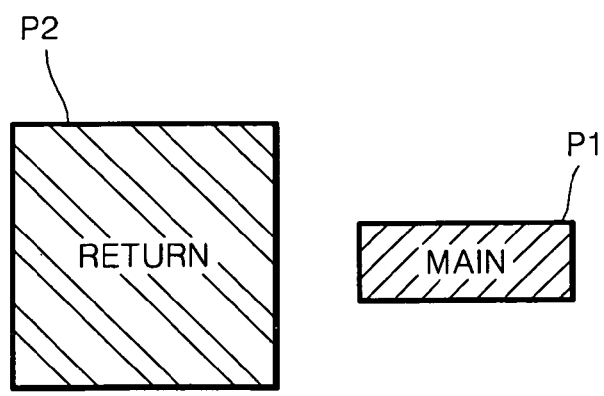
Figure 8:
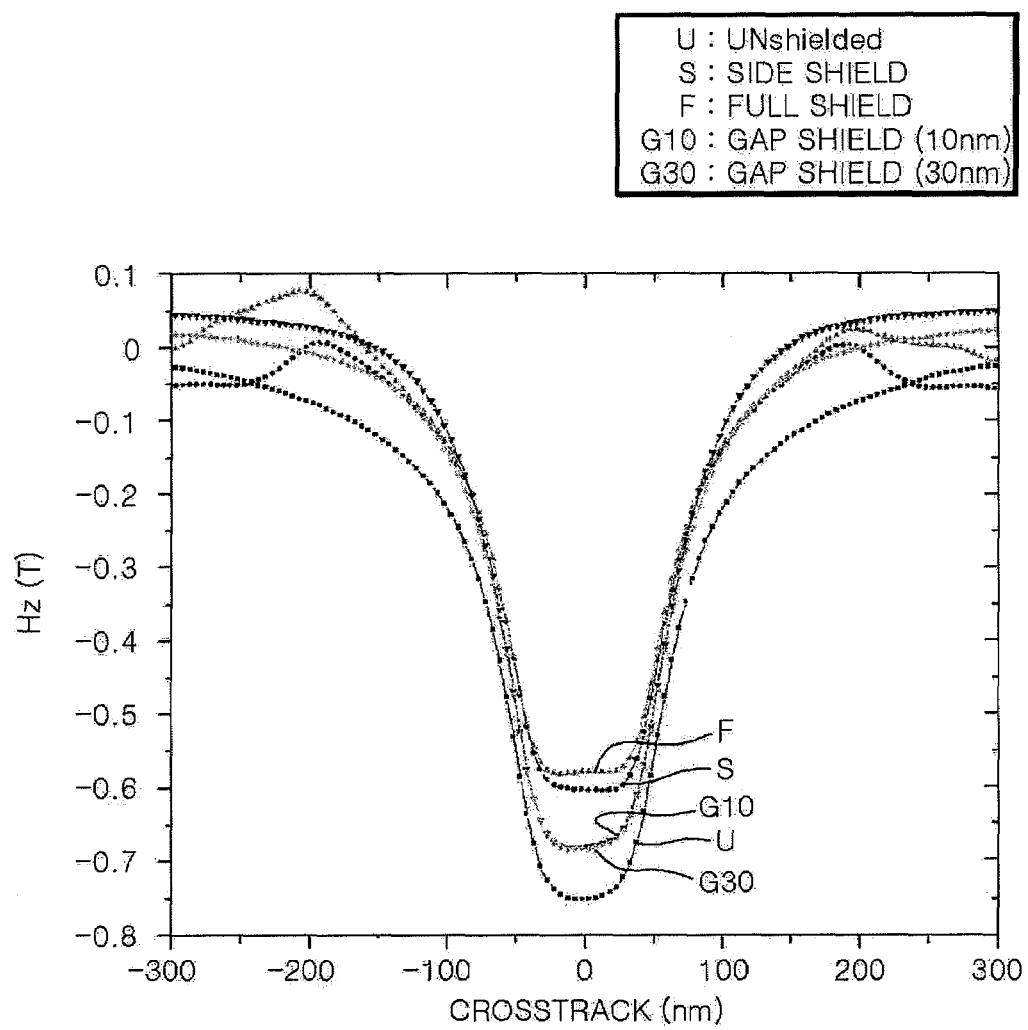
FIG. 8 is a graph illustrating perpendicular elements magnetic field Hz in the z-axis direction emitted from the main pole P1 of the perpendicular magnetic recording heads according to an exemplary embodiment of the present invention.

FIG. 8 is a graph illustrating the perpendicular field elements Hz in the z-axis direction (see FIG. 1) in the magnetic field emitted from the main pole P1 of the perpendicular magnetic recording heads. Here, a perpendicular magnetic recording head without a shield (U in FIG. 8), a perpendicular magnetic recording head including side shields (S in FIG. 8), and a perpendicular magnetic recording head including front shields on both sides of the main pole and the gap, are measured (F in FIG. 8). The horizontal axis of FIG. 8 denotes a cross-track distance in nm, and the vertical axis denotes perpendicular field elements Hz (T) of the magnetic field emitted from the main pole P1. The magnetic field unit is in tesla T.

The perpendicular magnetic field elements Hz emitted from the main pole P1 are important to record data on the perpendicular magnetic recording medium, the magnetization of the magnetic domain of the recording layer must be changed. The magnetization of the recording layer is changed by the perpendicular magnetic field elements of the magnetic field emitted from the main pole P1 of the perpendicular magnetic recording head. Accordingly, the magnetic flux density of the perpendicular elements (z-axis elements) of the magnetic field emitted from the main pole P1 may be great. Also, the width of the graph may be narrow and the inclination of the graph may be great around the center of the track (at 0 nm on the horizontal axis).

Referring to FIG. 8, in the perpendicular magnetic recording head without a shield, the strength of the magnetic field of the perpendicular magnetic field elements Hz is the greatest, however, the width of the graph is great and the inclination of the graph is the smallest. Accordingly, when there is no shield, the recording layer in the off track area may be magnetized, which is not preferable.

When shields are formed both at a side of the main pole P1 and at a side of the gap, the strength of the perpendicular magnetic field elements of the magnetic field emitted from the main pole P1 is the smallest. Though the width of the graph is narrow and the inclination of the graph is great, the strength of the magnetic field is small. The same applies to a perpendicular magnetic recording head including a side shield at a side of the main pole P1.

On the other hand, in the perpendicular magnetic recording head including a gap shield (G10, G30 in FIG. 8) according an exemplary embodiment of the present invention, the strength of the perpendicular magnetic field elements Hz of the magnetic field emitted from the main pole P1 is great next to the recording head without a shield, and the inclination of the graph is great and the width of the graph is narrow. Therefore, the perpendicular magnetic recording head with a gap shield shows the best result among the perpendicular magnetic recording heads in FIG. 8.

While the present invention has been particularly shown and described with reference to exemplary embodiments thereof, it will be understood by those of ordinary skill in the art that various changes in form and details may be made therein without departing from the spirit and scope of the present invention as defined by the following claims.

According to the exemplary embodiments of the present invention, a magnetic flux leakage can be prevented or minimized. Accordingly, when data is recorded on a magnetic recording medium, a magnetic flux leakage toward off tracks is prevented and data can be recorded only on a selected track, and the influence thereof can be minimized even when data is recorded on a track not selected, thereby improving the recording density of the track.

What is claimed is:

1. A perpendicular magnetic recording head comprising:
a main pole;
a return pole spaced a predetermined gap from the main pole;
an induction coil inducing a magnetic field on the main pole; and two or more gap shields, wherein the gap shields are formed in the gap between the main pole and the return pole and insulated from the main pole and the return pole, and wherein a length of the gap shields in a track direction of a recording medium, on which data is recorded by the perpendicular magnetic recording head, is smaller than a width of the gap in the track direction.

2. The perpendicular magnetic recording head of claim 1, wherein the gap shields are symmetrical around a line that connects centers of lower end surfaces (ABS) of the main pole and the return pole.

3. The perpendicular magnetic recording head of claim 1, wherein the width of the gap between lower end portions of the main pole and the return pole is 100 nm or less.

4. The perpendicular magnetic recording head of claim 1, wherein the gap shields are formed of a soft magnetic material.

5. The perpendicular magnetic recording head of claim 1, wherein the gap shields are formed of at least one of NiFe and CoNiFe.

6. A perpendicular magnetic recording apparatus comprising:

a magnetic recording medium on which data is recorded;

a writing magnetic head comprising:

a main pole which generates a magnetic field to the magnetic recording medium;

a return pole spaced a predetermined gap from the main pole;

an induction coil which induces a magnetic field on the main pole; and two or more gap shields; and a reading magnetic head comprising a magnetoresistance device which reads the data recorded on the magnetic recording medium, wherein the gap shields are formed in the gap between the main pole and the return pole and insulated from the main pole and the return pole, and wherein a length of the gap shields in a track direction of the recording medium, on which data is recorded by the perpendicular magnetic recording head, is smaller than a width of the gap in the track direction.

7. The perpendicular magnetic recording apparatus of claim 6, wherein the gap shields are symmetrical around a line that connects the centers of lower end surfaces (ABS) of the main pole and the return pole.

8. The perpendicular magnetic recording apparatus of claim 6, wherein the width of the gap between lower end portions of the main pole and the return pole is 100 nm or less.

* * * * *